May 25, 1965  G. L. SMITH  3,185,992
VEHICLE WARNING SYSTEM
Filed May 14, 1959  2 Sheets-Sheet 1

INVENTOR
GERALD L. SMITH

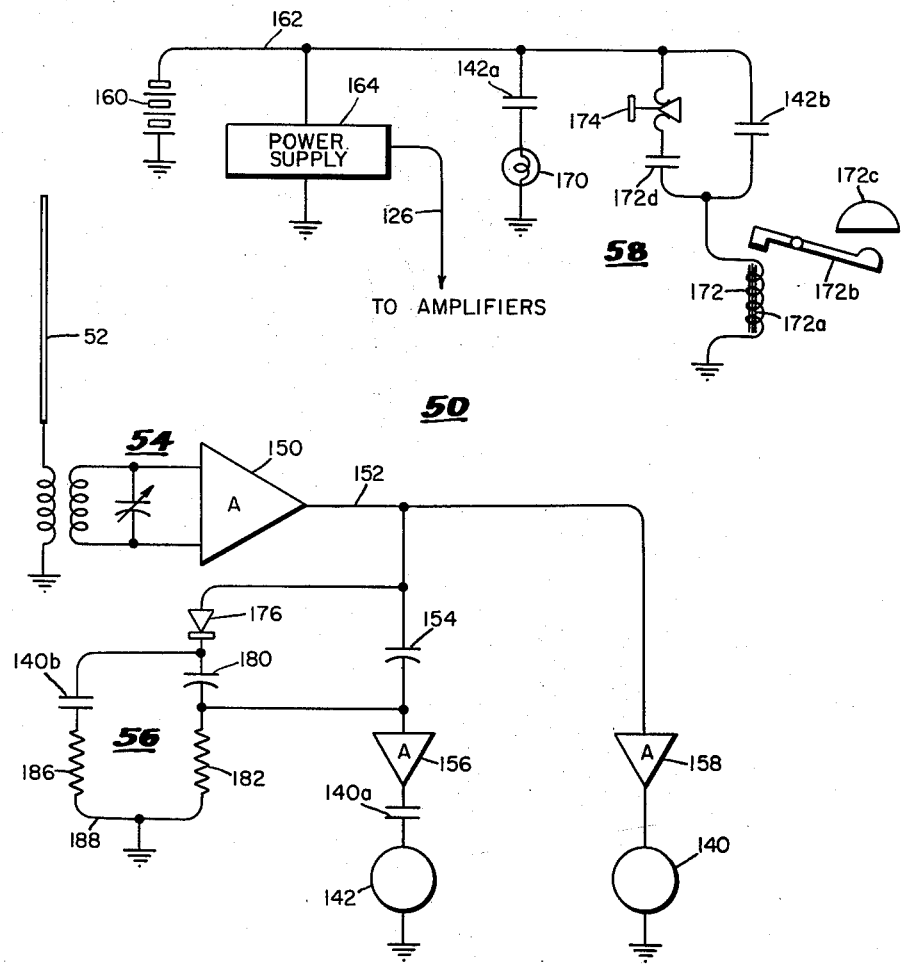

United States Patent Office 3,185,992
Patented May 25, 1965

3,185,992
VEHICLE WARNING SYSTEM
Gerald L. Smith, Round Bay, Box 125–B,
Severna Park, Md.
Filed May 14, 1959, Ser. No. 813,304
6 Claims. (Cl. 343—228)

This invention relates generally to vehicular warning devices, and more specifically to an improved method for forewarning a vehicle operator of an impending hazardous area of operation or zone of restrictive vehicular operation.

The invention will be described and illustrated in connection with an automobile, although it will be understood that such illustration and description are merely exemplary in that the principles and the means provided by the invention may be as well adapted with little or no modification to other types of vehicles wherein similar vehicular control warning problems exist.

Present day vehicle warning devices are limited almost exclusively to signs, which involve a myriad of designs, colors, and words. While under ideal conditions of vehicle operation, these devices are somewhat effective, they cannot always fit the human needs for safe vehicular operation in emergencies, in time of inclement weather, darkness or a combination thereof. The current designs of high rate of vehicular speed highways obviously now necessitate a more rapid and positive vehicle operator warning device. To attain this end with signs in the light of modern highway design, highly complex and expensive sign structures are required. This complexity is further intensified with the advent of much wider, multilane pavements wherein bridging and similar intricate sign support structure must be utilized. High speed, limited access highways have led frequently to "telescoping" or multi-vehicle accidents, wherein a high vehicular density (a large number of vehicles per lane moving at the higher design speed of the roadway) was not complemented with an effective corresponding hazard warning device. The highway sign, while remaining an oftentimes effective hazard warning device for low vehicular density, can produce only a sequential warning system to the operators of a line of moving vehicles.

Operative hazards such as landslides, wash-outs, fires and the like, or vehicular collisions obstructing high speed highways, demand the development of a hazard warning device which can effectively forewarn a plurality of highspeed oncoming vehicles at distances of a mile or more from such a danger in order that they might avoid further collision. Such a device must be a portable so as to be carried on emergency and law enforcement vehicles. It also must be of simple construction so as to insure reliability and yet remain within the range of economic practicability. As an example, the time and bulk requirement for distributing a required series of warning signs and/or lights along a highway up to the scene of an accident or a natural hazard is prohibitive both in time and danger to those placing said signs and/or lights.

Vehicular operational hazard warning devices presently in use are for the most part unable to compensate for the variations in the physical and mental capabilities of individual vehicle operators. These variations include the perception time, eyesight, and hearing ability of the operator. Present devices are located outside the confines of the vehicle, and this vehicle operator warning sign relationship requires an operator perceptive ability which, in view of present day high speeds, is oftentimes insufficient. In addition, present warning devices do not allow for the effective utilization of the auditory sense of the operator.

These disadvantages are readily overcome by the present invention which provides a radio transmitter to be situated at a site of hazardous or restricted operation for radiating a signal in all directions. A receiver for the radiated signal is installed in each moving vehicle and adapted to energize an operator alarm within the vehicle when the same has entered the radiation field of the transmitter.

Accordingly, it is a primary object of the present invention to provide a vehicle operator warning system in which the operator is continuously advised of a nearby zone of restricted operation.

It is another object of this invention to provide a transportation network having improved warning signal devices thereon operable through the media of rangecontrolled electromagnetic radiation propagation.

It is still another object of the present invention to provide a vehicle operator warning system which sufficiently forewarns an operator regardless of vehicle speed.

It is a further object of the present invention to provide a vehicle operator warning system which may be readily adapted to forewarn of hazardous operating conditions which are of a random nature.

A further object of the invention is to provide an improved vehicle operator warning means which can be easily installed on existing motor vehicles and which is economical to produce and efficient to operate in all conditions of adverse weather.

These and numerous other advantages and features of the present invention will be readily discerned by examining the subsequent detailed description in conjunction with the appended drawings, in which.

Figure 1:
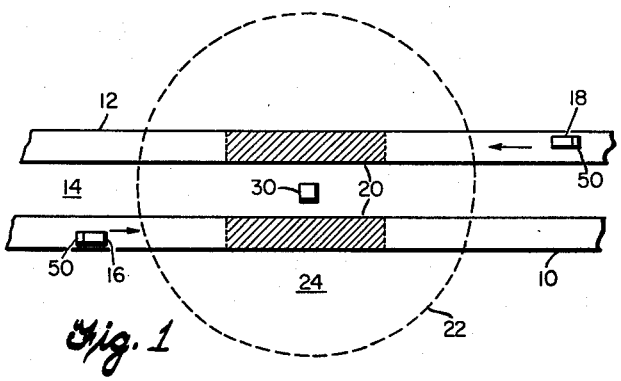
FIG. 1 is a diagrammatic view illustrating a highway warning system comprising a preferred embodiment of the present invention.

With reference now to the drawings and particularly to FIG. 1, a section of highway is constructed with a pair of parallel strips 10 and 12 separated by a center divider 14. The strips 10 and 12 are adapted to carry vehicles such as at 16 and 18 in opposite directions as denoted by the arrows. This mode of construction is typical of roadways designed for high speed travel such as parkways, turnpikes and freeways. These agencies are becoming increasingly necessary to safely accommodate the large volumes of traffic present in and around heavily populated communities. In the interest of public safety, certain sections of the highway are designated as reduced speed zones and the boundaries thereof are usually defined by signs informing vehicle operators of the lawful speed. Such a zone is shown as a shaded area 20.

In order to signal vehicles approaching zone 20, a low-power transmitter 30 is installed substantially in the center thereof. Transmitter 30 is adapted to radiate a signal outwardly in all directions about said zone. A dotted line 22 defines an area of coverage 24 about the transmitter 30. It may be observed that the area 24 encompasses and extends well beyond the restricted zone 20. Beyond the coverage area 24, the field strength of the radiated signal is negligible.

To detect signals from the transmitter 30, vehicles 16 and 18 are equipped with receiving apparatus 50 which includes an operator alarm. Each receiver 50 is responsive only to signals radiated by the transmitter 30. When a motor vehicle, such as at 16, enters the coverage area 24, the alarm mounted therein is actuated as a warning indication to the operator. Thus, as the operator of vehicle 16 approaches the reduced speed zone 20, he is warned of its immediacy upon entering the effective coverage area 24. In this manner, the operator is sufficiently forewarned of the approaching speed zone 20 so that he has time to take corrective action.

Similarly, due to the omni-directional characteristic of transmission, the operator of vehicle 18 is also notified of the situation.

Figure 2:
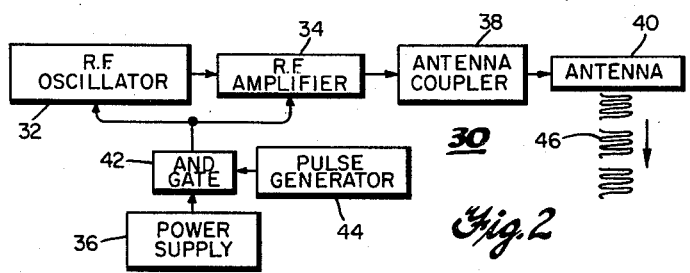
FIG. 2 is a block diagram of a radio transmitter utilized in the system of FIG. 1 for generating an electromagnetic wave.

The transmitter 30 is represented in block-diagram form in FIG. 2 to illustrate the construction utilized in the present invention. It is the function of the transmitter 30 to generate and transmit a pulsed radio-frequency electromagnetic wave which may be translated into a useful signal by the vehicle receivers 50. In FIG. 2, a radio-frequency oscillator 32 generates a signal of a fixed frequency. The generated signal is coupled to a power amplifier 34. A power supply 36 is connected via an and gate 42 to the oscillator 32 and amplifier 34. And gate 42 is controlled by a pulse generator 44. A transmitting antenna 40 is connected to the power amplifier 34 by means of an antenna coupler 38. A more detailed description of the transmitter 30 will be presented hereinafter.

In the operation of the transmitter 30, a radio-frequency signal is coupled to the antenna 40 whenever the and gate 42 is closed. Pulses from generator 44 periodically close the and gate 42 for a period of time equivalent to the pulse duration of the output of said generator. During this time, a quantity of radio-frequency energy is developed and coupled to the antenna 40. When the output of the pulse generator 44 ceases, the and gate 42 closes, operating potential is removed from the oscillator 32 and amplifier 34, and no signal is transmitted by the antenna 40. This sequence of operation is repeated in accordance with the pulse frequency of the generator 44. Thus, bursts of electromagnetic energy represented as at 46 are propagated by the antenna 40.

Figure 3:
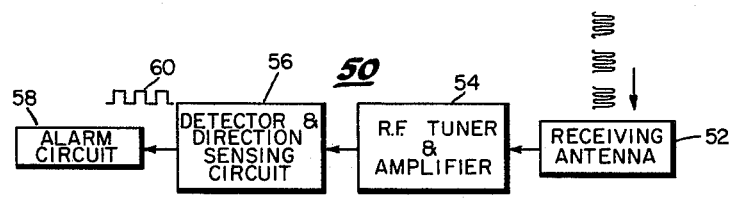
FIG. 3 is a block diagram showing apparatus for receiving electromagnetic energy generated by the transmitter in FIG. 2.

Typical apparatus for utilizing the output of transmitter 30 is shown generally in FIG. 3. In FIG. 3, a receiving antenna 52, preferably mounted on the exterior of a motor vehicle, is connected to a tuner and amplifier circuit 54. The amplified output of circuit 54 is then coupled to a detector and direction sensing circuit shown generally at 56. An alarm device 58 is connected to the output of circuit 56 and mounted within the confines of said vehicle so as to be easily observable from the operator's post.

Simply, the operation of the receiving apparatus 50 is as follows: A somewhat attenuated radio-frequency signal 46 is intercepted by the receiving antenna 52 and converted into an electrical potential thereby. The tuner and amplifier 54 selects and amplifies said electrical potential. Whereupon, the amplified radio-frequency potential is detected at 56 to produce a pulsating D.C. potential represented at 60. According to a method described hereinafter, the D.C. output 60 is only provided when a vehicle approaches a restricted zone 20. When supplied to the alarm 58 this D.C. potential causes the same to be periodically energized. As an example, the alarm 58 may comprise a light, the continual operation of which would serve to notify the operator.

Another utilitarian aspect of the present invention resides in its adaptability to perform certain emergency functions. Oftentimes, unpredictable hazards interfere with the normal, safe flow of vehicular traffic. For instance, a rock-slide may cover a roadway so that the passage of travel is hindered. Even more dangerous are the inter-vehicular accidents which completely obstruct the flow of traffic. Multi-vehicle accidents of the telescoping variety are becoming more frequent with the advent of superhighways and more powerful vehicles. Such tie-ups cause additional mishaps unless on-coming vehicles are warned promptly of the imminent danger.

It may be apparent that the transmitting apparatus of the present invention may be readily adapted for portable operation. And, inasmuch as the power requirements of the unit are quite small batteries would be adequate. These portable transmitters may be carried in patrol cruisers for emergency use. Yet greater utility is realized by providing means to vary the power output of each transmitter so as to expand the area of coverage 24 according to the amount of traffic involved.

Also, means are provided to selectively vary the pulse repetition rate of the transmitted signal in order to indicate to each vehicle operator the relative urgency of the immediate situation.

Figure 4:
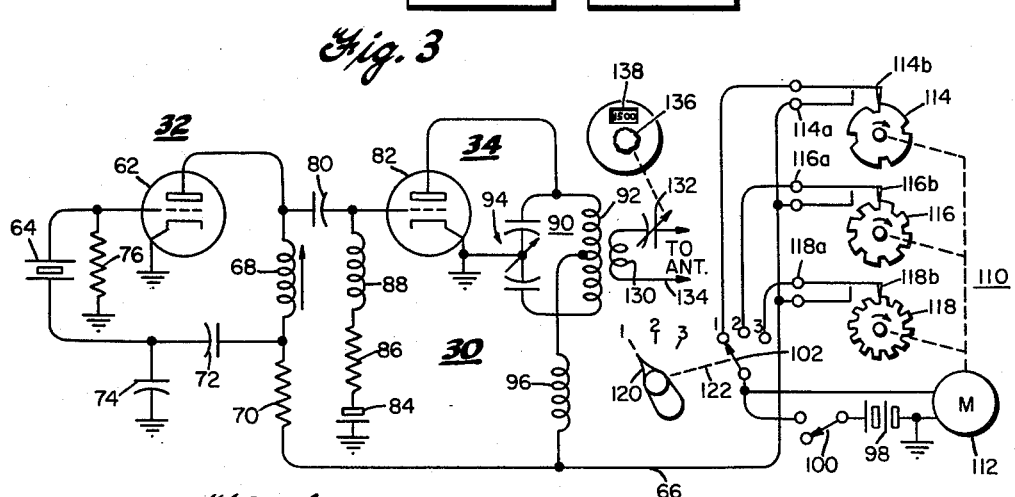
FIG. 4 is a detailed schematic diagram showing a modification of the transmitter of FIG. 2; and, FIG. 5 is a detailed schematic view of the receiving apparatus shown in FIG. 3.

Accordingly, the transmitter 30 of the present invention may be described in reference to FIG. 4. In FIG. 4, a triode 62 is used in a typical overtone oscillator circuit for generating a harmonic of the fundamental frequency of a piezo-electric crystal 64. A slug-tuned coil 68 and a dropping resistor 70 are serially connected in the plate circuit of the triode 62. The coil 68 is tuned to resonate at the harmonic frequency desired. To stabilize the oscillator 32 a capacitive feedback loop is provided by serially connecting a capacitor 72 and the crystal 64 between the grid of triode 62 and the plate circuit. Another capacitor 74 is connected to ground at the junction of capacitor 72 and crystal 64. A grid resistor 76 is also connected from the grid element of triode 62 to ground potential. Plate voltage is applied to the oscillator stage 32 by a line 66.

A capacitor 80 is used to couple the generated harmonic to the input of a final amplifier stage 34. A triode 82 may be adapted for class C operation by providing a source of grid bias 84. Cutoff bias is applied to the grid of triode 82 through a current limiting resistor 86 and a radio frequency choke 88. A tank circuit 90 comprising a center-tapped coil 92 and a split-stator variable capacitor 94 is inserted in the plate circuit of triode 82. Plate potential is applied via a radio frequency choke 96 connected between line 66 and the center tap of the coil 92.

Operating potential is applied to line 66 from a battery 98 by means of an on-off switch 100, a three position selector switch 102 and cam-actuated contacts 114a–118a of a timer 110. The timer 110 includes a plurality of cams 114–118 adapted to actuate electrical contacts 114a–118a in a predetermined manner and a timer motor 112. The periphery of each cam is provided with notches the number of which varies considerably from cam to cam. The cams are connected to a common axle and rotated at a constant rotational velocity by a motor 112. Movable arms 114b–118b are positioned to ride the periphery of their respective cams and to operate electrical contacts 114a–118a. To control the pulse repetition rate of transmitter 30, a knob 120 is mechanically linked to the switch 102 as indicated by the dotted line 122 and manually adjustable to one of three positions for selecting which set of timer contacts is interposed in the line 66.

A pickup loop 130 may be insulatively wound about the center of coil 92 to couple radio frequency energy to the antenna 40. Another variable capacitor 132 is serially connected with the pickup coil 130 to form a series resonant circuit which is connected to a transmission line 134. The capacitor 132 serves to adjust the amount of radio frequency power supplied the antenna 40. A vernier type control 136 may be geared to the rotor shaft of the capacitor 132 and provided with a dial 138. Of course, it should be apparent that a variable link coupling may also be utilized in lieu of the capacitor 132.

In the operation of the transmitter 30 for emergency use, switch 100 is manually closed to energize the timer motor 112. If the emergency condition is of relatively minor consequence, the operator moves the knob 120 to position (1) which directs the potential of battery 98 to the plate circuits of the transmitter through timer contracts 114a. It may be observed that the operation of the transmitter will be interrupted a predetermined number of times during a single revolution of the cam 112. Obviously, the same effect may be had by commonly connecting the cathode elements of triode 62 and triode 82 and inserting the timer contacts 114a between said common connection and ground. And, this may be desirable to eliminate the possibility of electric shock hazards due to the relatively high operating potentials present in the anode leads.

Concomitant with the presence of battery potential on line 66, the oscillator and amplifier stages 32 and 34 cooperate to produce a quantity of radio frequency power in the tank circuit 90. A portion of this power is withdrawn by the pickup loop 130 and fed to the coaxial antenna 40 where it is converted to electromagnetic waves about the area 24. The operator may select the amount of energy transmitted (and thus the area of coverage) by adjusting the control 136. Accordingly, the dial 138 may be calibrated in units of distance, such as yards, to indicate the effective range of the transmitter. If an emergency occurs during hours of heavy traffic, the operator may extend the useful range of the warning signal by turning knob 136 to increase the effective capacitance of the capacitor 132. Other methods may be used to regulate the power output of the transmitter such as regulating the plate voltage of the triode 82 with a rheostat.

Referring to FIGURE 5, a detailed view of the receiving element 50 of the hazard warning device is shown. This element, positioned in view of the operator within the confines of a vehicle, is designed to be operable only within the preset range of the transmitter 30. When within the range of said operating transmitter, the receiver will actuate both an aural and visual warning mechanism, however it will only provide this operative information while the vehicle within which it is mounted is in motion toward the transmitting device. The directional sensing circuit of the hereinafter described receiving element, therefore, will apprise the vehicle operator of an impeding hazardous condition, and will not function as said vehicle passes the point of transmission.

Electromagnetic radiation 46 from the transmitter 30 is impressed across antenna 52 of the receiving element. This radiation generates a potential which is then presented to a frequency selective circuitry commonly referred to as a "fixed frequency tuned circuit." The signal therefrom is presented to one or a plurality of amplifiers 150 wherefrom a voltage signal is developed on line 152 and directed across a common coupling capacitor 154 to an amplifier 156.

Amplifier 158, also connected to the output of amplifier 150, develops a current sufficient to energize relay 140, which in turn closes contacts 140a and 140b. The closure of relay 140a then permits relay 142 to be energized by amplifier 156.

The electrical power system of the vehicle in which the receiver element 50 is mounted is represented by the battery 160. The voltage of battery 160 exists on line 162 which is connected to a high voltage power supply 164. Converter 164 suitably increases this battery voltage to a value practical to the functioning of the receiving circuitry. This voltage is directed to amplifiers 150 and 156 by means of a line 126. Power from source 160 is also directed over line 162 to the hereinafter described aural-visual warning circuitry 58.

Referring to the aural-visual alarm circuitry shown generally at 58, the closure of contacts 142a allows the energizing of a warning light 170. Relay 142 serves to close contacts 142b which allows a solenoid 172 to become energized. Solenoid 172 then magnetizes the rod 172a, operating a suitable clapper device 172b which in turn, strikes a chime 172c. Solenoid 172 also closes contacts 172d which provides a holding circuit to maintain a voltage across the solenoid coil until a normally closed switch 174 is manually opened. Thus, the above described holding circuitry allows only one audible signal to be produced as the vehicle approaches within the range of transmitter 30.

Referring to the directional sensitivity circuit shown generally at 56, the A.C. voltage from line 152 is converted to a pulsating D.C. voltage by a rectifier 176. Capacitor 180 is charged through a resistor 182 by the above mentioned D.C. voltage from line 184. Capacitor 180 accumulates a successively larger charge as the receiving device approaches the transmitting source 30. As the vehicle passes the point of transmission, the electromagnetic radiations become progressively weaker. Therefore, the signal voltage on line 152 decreases. The charge accumulated by capacitor 180 is discharged through resistor 186 and contacts 140b.

Contacts 140b are normally open during the reception of each signal, to prevent the discharge of capacitor 180 between the reception of transmitted signals. Resistor 186 is inserted to maintain a resistance value such that the rate of discharge of capacitor 180 is less than the rate of charge thereof. As the receiver is moved away from the point of transmission, the voltage drop produced across resistor 182 and applied to the input of amplifier 156, is of such opposing polarity as to prevent the energizing of relay 142 by said amplifier. This also prevents the operation of the aural-visual warning devices at 58.

Relay 140 will continue to be energized from amplifier 158 until such time as the vehicle-mounted receiving unit is removed from the effective area of coverage 24. Upon leaving said area, the receiving device therefort, is rendered ineffective. Accordingly, both audible and visible notification of impending hazards are provided within the confines of a vehicle. Said signals occur only as the vehicle approaches the point of transmission from within an accurately calibrated radius of electromagnetic energy propagation.

The above-described warning system is only exemplary in the instance of automobile warning as this device may be used as warning control for other types of vehicles. Also, from the foregoing, it will be apparent to those skilled in the art, that various changes may be resorted to, without departing from the spirit or scope of the invention.

What is claimed is:

1. A warning system for an operator-manned vehicle traveling on a course including a zone of restricted operation comprising, means for continuously generating and radiating radio-frequency energy, means for periodically interrupting said radiated energy to produce pulses of radiated energy at a magnitude to be radiated outwardly in all directions, a transmitting antenna, means for mounting said transmitting antenna substantially at the center of said restricted zone, adjustable means for coupling a portion of said interrupted radio-frequency energy to said transmitting antenna to establish an area of coverage about said restricted zone, means for adjusting said coupling means to change said area of coverage, a receiving antenna for converting said radiated pulses of radio-frequency energy into an electrical potential, means for mounting said receiving antenna on said vehicle, electrical circuit means including means for amplifying said potential and a detector for producing electrical impulses in accordance therewith, an operator alarm responsive to said electrical impulses, means for locating said operator alarm within said vehicle, and means for connecting said electrical circuit means to said operator alarm to continually energize the same when said vehicle is located within said predetermined area of coverage.

2. A system substantially as set forth in claim 1 in which said interrupting means comprises a timer-operated switching circuit having a plurality of manually selectable rates of operation.

3. A warning system for an operator-manned vehicle traveling on a course including a zone of restricted operation comprising, oscillator means for generating a radio-frequency signal, amplifier means having an input adapted to receive said generated radio-frequency signal and an output adapted to supply an amplified radio-frequency signal, means for connecting said oscillator to said amplifier input, a source of operating potential for said oscillator and said amplifier, means for periodically connecting said source of potential to said oscillator and said amplifier for producing a series of pulses of radio-frequency energy at said output of said amplifier, said last named means comprising a timer-operated switching circuit having a plurality of manually selectable rates of operation, a transmitting antenna, means for mounting said transmitting antenna substantially at the center of said restricted zone, adjustable means connected to said amplifier output for coupling a portion of said interrupted radio-frequency energy to said transmitting antenna to establish an area of coverage about said restricted zone, means for adjusting said coupling means to regulate said area of coverage, a receiving antenna for converting said radiated radio-frequency energy into an electrical potential, means for mounting said receiving antenna on said vehicle, electrical circuit means including means for amplifying said potential and a detector for producing electrical impulses in accordance therewith, an operator alarm responsive to said electrical impulses, means for locating said operator alarm within said vehicle, and means for connecting said electrical circut means to said operator alarm to continually energize the same when said vehicle is located within said predetermined area of coverage.

4. A warning system for an operator-manned vehicle traveling on a course including a zone of restricted operation comprising, oscillator means for generating a radio-frequency signal, amplifier means having an input adapted to receive said generated radio-frequency signal and an output adapted to supply an amplified radio-frequency signal, means for connecting said oscillator to said amplifier input, a source of operating potential for said oscillator and said amplifier, means for periodically connecting said source of potential to said oscillator and said amplifier for producing a series of pulses of radio-frequency energy at the output of said amplifier, said last-named means comprising a timer-operated switching circuit having a plurality of manually selectable rates of operation, a transmitting antenna, means for mounting said transmitting antenna substantially at the center of said restricted zone, a coupling circuit comprising an inductive element and a variable capacitive element in series connection, means for mounting said inductive element adjacent said output of said amplifier to receive a portion of said amplified pulses of radio-frequency energy, means for varying the electrical capacitance of said capacitive element to control the amount of energy received by said inductive element, means connected to said varying means for indicating the amount of said energy received, means for electrically connecting said transmitting antenna in parallel with said inductive and said capacitive elements of said coupling circuit to radiate said pulses of radio-frequency energy over an area of coverage correlatable to the amount of radio-frequency energy received by said inductive element, a receiving antenna for converting said radiated pulses of radio-frequency energy into a radio-frequency potential, means for mounting said receiving antenna on said vehicle, receiver means comprising a radio-frequency tuner and amplifier, means for connecting said radio-frequency tuner and amplifier to said receiving antenna to select said radio-frequency potential, a radio-frequency detector, means for connecting said radio-frequency detector to said radio-frequency tuner and amplifier to produce a series of direct current pulses of a duration and repetition in accordance with said radiated pulses, an operator alarm responsive to said direct current pulses to produce an observable effect, means for locating said operator alarm within said vehicle, and means for electrically connecting said radio-frequency detector to said operator alarm to continually energize the same when said vehicle is located within said area of coverage.

5. A warning system for an operator-manned vehicle traveling on a course including a zone of restricted operation comprising, oscillator means for generating a radio-frequency signal, amplifier means having an input adapted to receive said generated radio-frequency signal and an output adapted to supply an amplified radio-frequency signal, means for connecting said oscillator to said amplifier input, a source of operating potential for said oscillator and said amplifier, means for periodically connecting said source of potential to said oscillator and said amplifier for producing a series of pulses of radio-frequency energy at the output of said amplifier, said last-named means comprising a timer-operated switching circuit having a plurality of manually selectable rates of operation, a transmitting antenna, means for mounting said transmitting antenna substantially at the center of said restricted zone, a coupling circuit comprising an inductive element and a variable capacitive element in series connection, means for mounting said inductive element adjacent said output of said amplifier to receive a portion of said amplified pulses of radio-frequency energy, means for varying the electrical capacitance of said capacitive element to control the amount of energy received by said inductive element, means connected to said varying means for indicating the amount of said energy received, means for electrically connecting said transmitting antenna in parallel with said inductive and said capacitive elements of said coupling circuit to radiate said pulses of radio-frequency energy over an area of coverage correlatable to the amount of radio-frequency energy received by said inductive element, a receiving antenna for converting said radiated pulses of radio-frequency energy into a radio-frequency potential, means for mounting said receiving antenna on said vehicle, receiver means comprising a radio-frequency tuner and amplifier, means for connecting said radio-frequency tuner and amplifier to said receiving antenna to select said radio-frequency potential, a radio-frequency detector, means for connecting said radio-frequency detector to said radio-frequency tuner and amplifier to produce a series of direct current pulses of a duration and repetition in accordance with said radiated pulses, a direction sensing circuit responsive to the magnitude of said received pulses of radio-frequency energy to generate a blocking signal when said magnitude decreases, an operator alarm responsive to said direct current pulses to produce an observable effect, means for locating said operator alarm within said vehicle, means for interconnecting said operator alarm and said direction sensing circuit for energizing said alarm only when said vehicle approaches said restricted zone.

6. A warning system substantially as set forth in claim 5 in which said direction sensing circuit comprises a diode for rectifying said received radio-frequency energy, a capacitor to develop a voltage proportional to the magnitude of said received radio-frequency energy, a resistive element, means for respectively serially connecting said diode, said capacitor and said resistive element, means for connecting said series connection across the output of said radio-frequency tuner and amplifier, means for connecting said operator alarm to the junction of said capacitor and said resistive element, and means for discharging said capacitor as said vehicle emerges from said restricted zone.

References Cited by the Examiner
UNITED STATES PATENTS

| | | | |
|---|---|---|---|
| 1,808,022 | 6/31 | Del Prete | 340—33 |
| 2,218,907 | 10/40 | Donnelly | 343—101 |
| 2,382,557 | 8/45 | Frazier | 343—112.4 |
| 2,407,417 | 9/46 | Halstead | 179—2 |
| 2,429,607 | 10/47 | Capen | 343—228 XR |
| 2,442,851 | 6/48 | Halstead | 340—32 |
| 2,459,105 | 1/49 | Halstead | 343—228 |
| 2,521,129 | 9/50 | Sampson | 325—314 |
| 2,656,002 | 10/53 | Keeton | 343—101.2 |
| 2,761,127 | 8/56 | Miessner | 340—349 |
| 2,841,700 | 7/58 | Hallden | 325—37 |
| 2,877,343 | 3/59 | Mitchell | 325—31 XR |
| 2,968,802 | 1/61 | Flory et al. | 340—32 |
| 2,980,793 | 4/61 | Daniel | 340—32 |
| 3,044,043 | 7/62 | Wendt | 340—32 |

OTHER REFERENCES

Publication: "Radar Speedometer Receiver," CQ January 1958; pages 27, 105 and 107.

NEIL C. READ, *Primary Examiner.*

BENNETT G. MILLER, ROBERT H. ROSE, STEPHEN W. CAPELLI, *Examiners.*